United States Patent [19]

Doty

[11] Patent Number: 4,493,529
[45] Date of Patent: Jan. 15, 1985

[54] ELECTROMAGNETIC ENERGY SIGNAL-CARRYING CONNECTOR HAVING SECURE STRAIN-RELIEF MECHANISM

[75] Inventor: John S. Doty, Yucaipa, Calif.

[73] Assignee: Hughes Aircraft Company, El Segundo, Calif.

[21] Appl. No.: 403,446

[22] Filed: Jul. 30, 1982

[51] Int. Cl.³ .............................................. G02B 5/14
[52] U.S. Cl. .................................. 350/96.20; 339/104
[58] Field of Search ............... 350/96.21, 96.22, 96.20; 339/104, 115 C, 116 C, 117 P

[56] References Cited

U.S. PATENT DOCUMENTS

| | | |
|---|---|---|
| 3,129,993 | 4/1964 | Ross . |
| 3,271,726 | 9/1966 | Pfendler . |
| 3,564,709 | 2/1971 | Hickton . |
| 3,725,845 | 4/1973 | Moulin . |
| 4,008,948 | 2/1977 | Dalgleish et al. . |
| 4,047,797 | 9/1977 | Arnold et al. .................. 350/96.21 |
| 4,092,396 | 5/1978 | McCartney et al. . |
| 4,184,742 | 1/1980 | Corrales . |
| 4,190,316 | 2/1980 | Malsby et al. . |
| 4,279,466 | 7/1981 | Makuch et al. ................. 350/96.21 |
| 4,279,467 | 7/1981 | Borsuk et al. .................. 350/96.21 |
| 4,283,125 | 8/1981 | Borsuk . |
| 4,319,802 | 3/1982 | Bowes . |
| 4,405,200 | 9/1983 | Hoffmann et al. ............. 350/96.21 |

FOREIGN PATENT DOCUMENTS 2504893 2/1981 United Kingdom ............ 350/96.21
2054191 2/1981 United Kingdom .

*Primary Examiner*—Eugene F. Desmond
*Attorney, Agent, or Firm*—Lewis B. Sternfels; W. J. Bethurum; A. W. Karambelas

[57] ABSTRACT

An interchangeable multi-channel hermaphroditic fiber optic connector (10) for cables (12), having different numbers of optical fibers (18) and contacts (22) therefor, comprises a connector shell (34) having a specifically configured interior surface (38) and a plurality of inserts (26) each having an exterior surface (36) which is configured substantially as the connector shell's interior surface. This substantially similar configuration permits interchangeable insertion of any of the inserts within the connector shell. The inserts have different numbers of cavities (28) in order to accommodate any number of optical fibers and their contacts, without needing to change the entire connector structure. A strain relief (62, 64, 66, 100) is coupled to the inserts, and an uncoupling prevention mechanism (104, 108) is housed about the strain relief and the insert to isolate turning moments exerted by a nut (124) on the exterior of the connector from being exerted on, and from uncoupling the internally secured members (26, 62, 64, 66).

12 Claims, 9 Drawing Figures

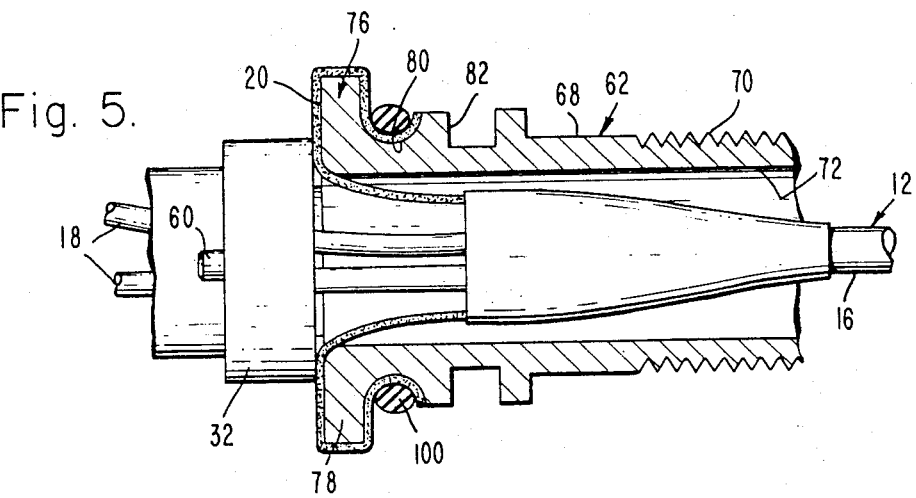
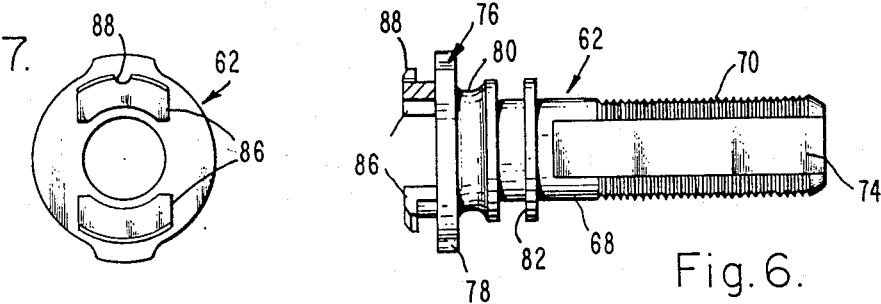
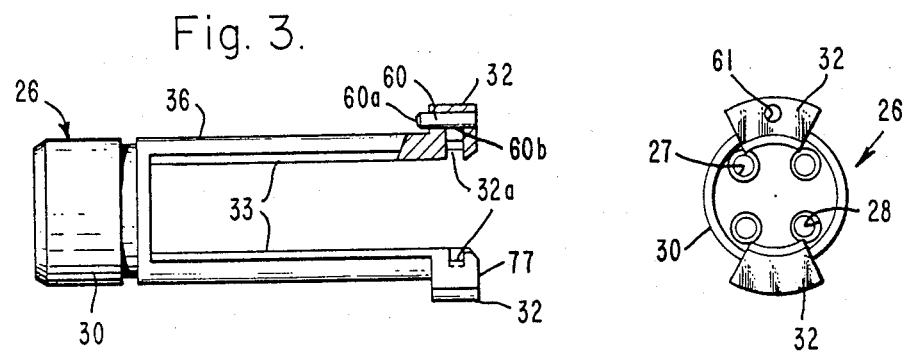
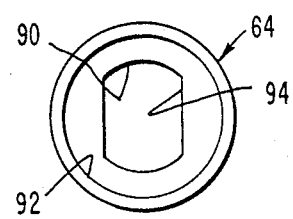
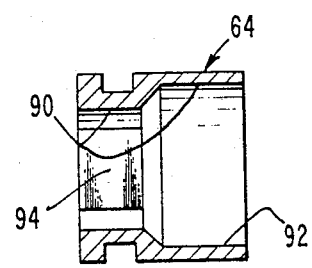

ELECTROMAGNETIC ENERGY SIGNAL-CARRYING CONNECTOR HAVING SECURE STRAIN-RELIEF MECHANISM

BACKGROUND OF THE INVENTION

1. Field of the Invention

The present invention relates to a connector for terminating electromagnetic energy signal-carrying means (e.g. optical fibers) and, in particular, to such a connector which is adaptable not only to terminate any one of a plurality of cables having different numbers of such signal-carrying means and their terminations but also to provide securely maintained strain-relief of cable filaments to the connector.

2. Description of the Prior Art

While the present invention was developed for terminating optic fiber cables, it is to be understood that it is as adaptable to any electromagnetic energy signal-carrying means.

Fiber optic connectors are conventionally designed to accomodate a specific number of optical fibers and their terminations. To accept a different number of fibers, a different connector of the same general design, but specifically configured to receive that number of fibers, is used to provide a sufficient number of channels therefor. Thus, it becomes expensive to manufacture a large number of connectors, one for each cable, and the tooling therefor.

In addition, the optical fibers are conventionally housed in a cable having strength filaments to protect the fibers from strain and consequent breakage. The filaments are generally secured to the connector by a strain-relief coupling to couple the connector directly to the cable and also to prevent strain from being imparted to the fibers. When the connector is handled, e.g., coupled with and uncoupled from a mating connector, the stain-relief coupling and/or other internal engagements of components within the connector can be easily disengaged or loosened, which may lead to undesired tension on and breaking of the optical fibers.

SUMMARY OF THE INVENTION

The present invention avoids these and other problems by providing a connector which can interchangeably accomodate a plurality of inserts which are designed to accept different numbers of optical fibers housed in a single cable and their terminations (e.g., contacts). The design is such that all terminating contacts can be polished at a single time. Included with the interchangeable design is a reusable strain-relief coupling for securing strength members in the cable to the connector so that tensile forces on the cable are not transmitted to the fibers. The strain-relief coupling and the insert are secured together. An important feature of the connector protects the engagements of the strain-relief coupling respectively with the connector insert and with the strength member filaments.

The connector design provides several advantages, among which the following are illustrative. A single standardized connector may be used, with only inserts therefor being specialized for the number of optical channels used. Thus, the number of different pieces of connector hardware are substantially reduced with considerable savings in cost. By housing all fiber optic terminations in a single insert, the time for polishing their ends is reduced through the ability to polish all terminations at the same time. The handling of fibers and terminations are substantially reduced, with the result of a decreased breakage of fibers. Insertion of the contacts in the inserts may be made without the use of specially designed tools. Fibers, bonded in the contacts which are in place in the inserts, are automatically at their proper lengths from the strain relief, to minimize strain on the fibers themselves. The strain relief coupling is protected from uncoupling during engagement and separation of mating connectors. The fibers, which are an intergral part of their housings, can be bonded in position to enable freedom for movement of the contacts.

Other aims and advantages, as well as a more complete understanding of the present invention, will appear from the following explanation of exemplary embodiments and the accompanying drawings thereof.

BRIEF DESCRIPTION OF THE DRAWINGS

FIG. 3 is an elevational view of an insert which is placeable within a connector shell (see FIGS. 1 and 2), with FIG. 4 being an end view of the insert;

FIG. 5 is a cross-sectional view of a strain relief mechanism with strength member filaments coupled thereto used in both embodiments depicted in FIGS. 1 and 2; FIG. 6 is a partial cross-section of a strain relief body used in the strain relief mechanism shown in FIG. 5, with FIG. 7 being an end view thereof; and FIGS. 8 and 9 respectively are side and end views of a pressure sleeve used in the mechanism depicted in FIG. 5.

DETAILED DESCRIPTION OF THE INVENTION

Figure 1:
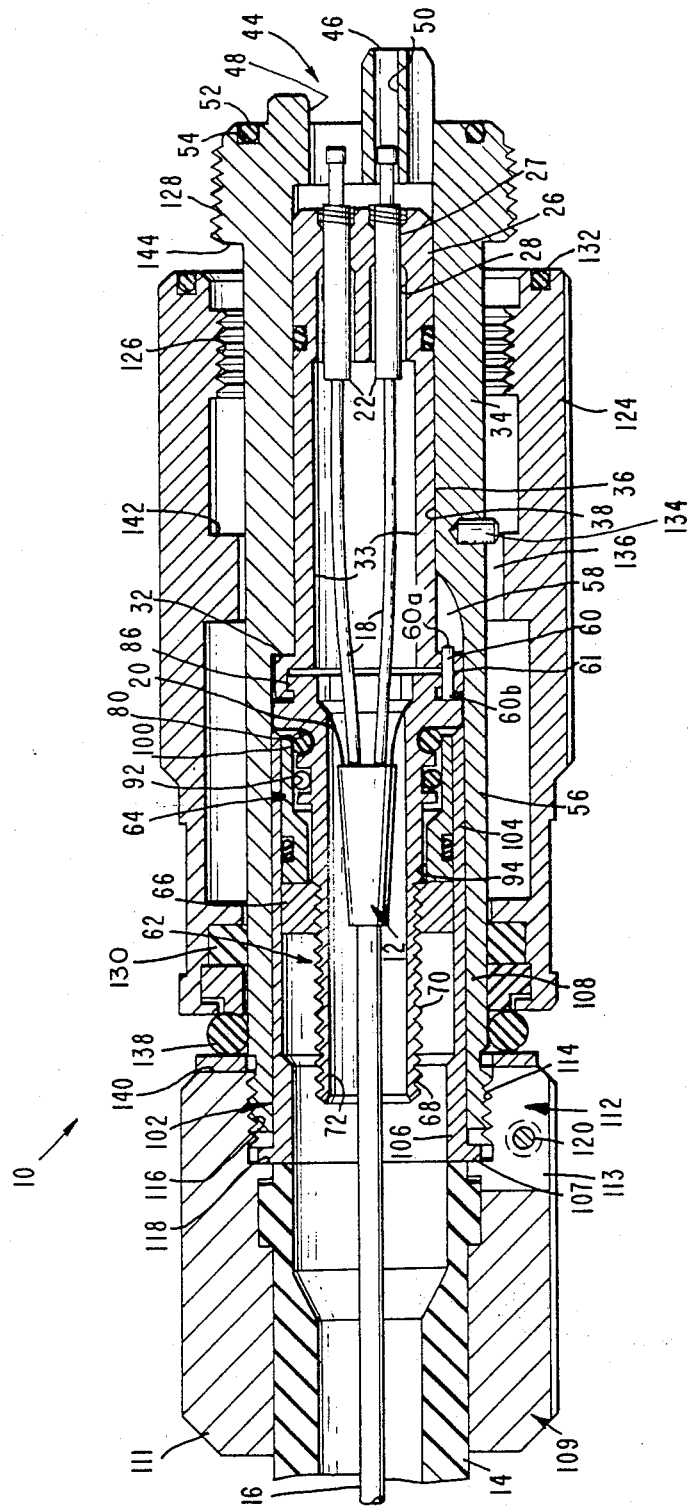
FIG. 1 is cross-sectional view of a first embodiment of the invention illustrating a preferred fiber optic connector construction.
Figure 2:
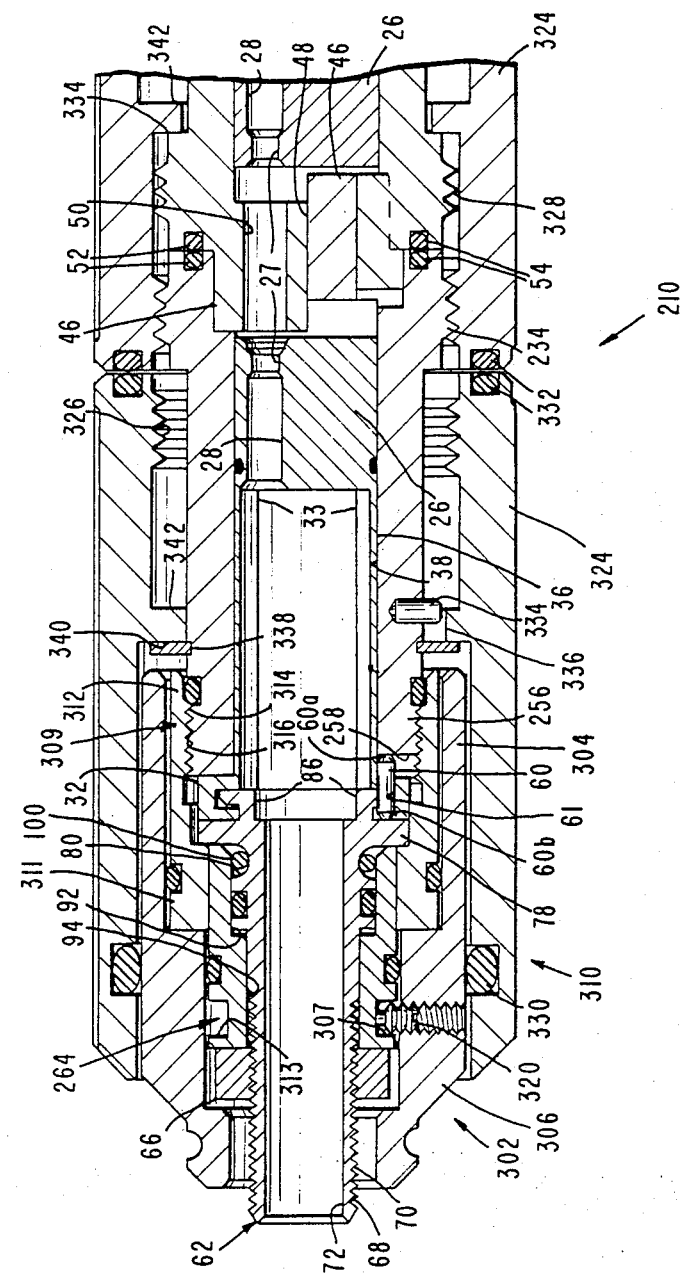
FIG. 2 is a cross-sectional view of a second embodiment of the invention showing a pair of mated fiber optic connectors.

FIGS. 1 and 2 depict two embodiments of fiber optic connectors 10 and 210. Because both embodiments have many similarities, both will be concurrently described with the same numerals used for the same parts. When the parts differ, the embodiment in FIG. 2 will be denoted by digits which are 200 numbers higher than those in FIG. 1. Thus, for those indicia in FIG. 1 respectively below and above "100", the FIG. 2 embodiment will include indicia in respective "200" and "300" series. Each embodiment's connector is disposed to be engaged with its respective mating connector to bring its terminated optical fiber cable 12 into alignment with the corresponding cable of its mating connector, and thereby to effect coupling of their optical signals. To help secure one cable 12 to its connector and to protect the cable from being bent sharply, a conventional strain-relief boot 14 is secured in firm contact with the connector and the cable.

As shown, cable 12 comprises an outer jacket 16 through which optical fibers 18 and strength members 20 extend. The optical fibers are respectively terminated in contacts 22, which are coupled to mating contacts such as by a split sleeve-spacer device. For a more complete description of the contact and split sleeve-spacer device construction, reference is made to copending patent application, Ser. No. 64,032. It is to be understood, however, that other contact coupling mechanisms mahy be used, although the preferred mechanism is described in the copending application. The means by which strength member 20 is rigidly retained in connector 10 or 210 is described below.

Contacts 22 are retained within an insert 26 (see also FIGS. 3 and 4) by a contact retention system, such as is also described in copending patent application Ser. No. 65,032 and in U.S. Pat. No. 3,792,416, and includes retaining clips placed about contacts 22 which engage annular portions 27 (see FIGS. 1, 2 and 4) within through bores 28 at front end 30 of the insert. There are as many insert bores 28 as there are optical fibers 18 of cable 12. Therefore, for a single fiber cable, only a single bore 28 need be provided in an insert 26. As illustrated, insert 26 depicts a four channel insert. It is obvious that, if connector 10 or 210 were to couple any other number of optical fibers, insert 26 would have a like number of bores 28 for retention of contacts 22 therein.

With respect to polishing of the fiber optic contacts, the present invention permits mounting of all the contacts in the single insert which may then be fitted within an appropriately sized cradle of a polishing tool, such as described in U.S. Pat. No. 4,330,965 and copending patent application, Ser. No. 376,866.

As shown in FIGS. 3 and 4, insert 26 includes a pair of curved arms 33 which are secured to the body of front end 30 and extend rearwardly therefrom. A pair of coupling flanges 32 terminate arms 33 which permit the flanges to flex with a slight radial movement.

Insert 26 is disposed to fit closely within a connector shell 34 (FIG. 1) or 234 (FIG. 2). To this end, the insert and the connector shell are provided respectively with exterior and interior surfaces 36 and 38 whose configurations are substantially identical so that any number of inserts, whether having a single bore or plurality of bores 28, may be interchangeably inserted within the connector shell.

At its front end 44, the connector shell is configured in a mutually keyable relationship with a connector shell of a mating like connector, and is preferably of a hermaphroditic configuration defined by a generally half circular key-like protuberance 46 adjacent to a slot-like recess 48. Protuberance 46 and recess 48 are so configured that the protuberance of one connector shell will fit snugly within a recess 48 of a connector shell of a mating connector. In addition, one or more bores 50 extend through key-like protuberance 46 and house half the number of contacts 22, with the remaining half of the contacts extending within slot-like recess 48. As shown in FIG. 1, the contacts do not extend beyond the front face of front end 44. If desired, the interfitting hollow post concept of U.S. Pat. No. 3,725,845 may be used in lieu of protuberance 46 and recess 48.

Split sleeve-spacer devices are placed on those contacts which extend into bores 50 of protuberance 46 when insert 26 is fully placed within connector shell 34. To provide environmental sealing between mating connectors, an O-ring 52 is placed within an annular recess 54 in the front face of front end 44 of each connector shell so that the respective O-rings of the mating connectors abut and are squeezed and pressed against one another.

Middle portion 56 of connector shell 34 (FIG. 1) and rear end 256 of connector shell 234 (FIG. 2) respectively have a coupling slot 58 and 258, each of which forms a part of the non-rotatable interengagement between the connector shell and the insert. Specifically, a pin 60 (see also FIGS. 3 and 4) is affixed within a hole 61 (see FIGS. 1, 2 and 4) in one of the coupling flanges 32 of insert 26. One end 60a (see FIG. 3) of the pin extends forwardly of the flange and into slot 58 or 258 of the connector shell. The position of flanges 32, pin 60 within its flange, and the slot of the connector shell are such as to align insert bores 28 with connector shell bores 50 so that contacts 22, when secured within the insert recesses, will be properly aligned with respect to the connector shell bores. As indicated before, it is preferred that split sleeve-spacer devices extend from those contacts which are aligned with bores 50.

Securement of cable 12 to and within connector 10 or connector 210 is effected by a strain relief mechanism (FIG. 5) including a strain relief body 62 (FIGS. 6 and 7), a pressure sleeve 64 and 264 (FIGS. 1, 2, 8 and 9) and a pressure sleeve nut 66 (FIGS. 1 and 2) whose assembly is best depicted in FIGS. 1 and 2.

Strain relief body 62 includes a rearwardly extending tubular shank 68 having an externally threaded surface 70, a through bore 72 and a pair of diametrically and parallelly positioned flat sides 74, one of which is shown in FIG. 6. At its front end 76, strain relief body 62 includes a collar 78. Between the collar and shank 68 is a U-shaped annular recess 80 and a generally square-shaped recess 82. An O-ring (see FIGS. 1 and 2) is placed within the square-shaped recess to provide an environmental seal between strain relief body 62 and pressure sleeve 64 or 264.

Extendingly forwardly from collar 78 are a pair of diametrically placed coupling flanges 86, as best seen in FIGS. 6 and 7. A groove 88 (FIG. 7) is placed within one of flanges 86 and is adapted to cooperate with end 60b (see FIGS. 1, 2 and 3) of pin 60 which, as stated previously, is held within one coupling flange 32 of insert 26. Specifically, when front end 76 of strain relief body 62 is placed against rear end 77, which is adjacent flanges 32 of insert 26, so that flanges 86 of the strain relief body are positioned approximately 90° with respect to flanges 32 of the insert, a 90° rotation therebetween permits flanges 86 to move within recesses 32a (FIG. 3) of flanges 32 to form a coupling therebetween. A rotation of that flange 86 having groove 88 therein into that flange 32 having pin 60 therein permits pin end 60b to cam against and thereby to cause flange 32 to be slightly moved radially outwardly against the spring bias of arm 33 so that pin end 60b will latch within groove 88 to secure the strain relief coupling to the insert.

Pressure sleeves 64 and 264 are adapted to be slipped oer their respective strain relief body 62 and, to this end as shown in FIGS. 1, 2, 8 and 9, each pressure sleeve includes a through bore 90 having a circular portion 92 and a non-circular portion 94, the latter having a pair of diametrically opposed flat sides. Pressure sleeves 64 and 264 are respectively adapted to be placed over tubular shank 68 of their respective strain relief body 62 so that circular portion 92 of the pressure sleeve extends over U-shaped recess 80 and square-shaped recess 82 and abuts against collar 78 of the strain relief body. Flat sides 94 of sleeve 64 or 264 key against flat sides 74 of the strain relief body to prevent rotation of the pressure sleeve with respect to the strain relief body.

Pressure sleeve nut 66 (see FIGS. 1 and 2) is provided with internal threads which engage threaded surface 70 of strain relief body 62 so that, when nut 66 is fully screwed onto body 62, it will bear against pressure sleeve 64 (264) to press it firmly against collar 78 and the filaments of strength member 20 thereon.

Cooperation among strain relief body 62, pressure sleeve 64 (264) and pressure sleeve nut 66, together with flanges 32 of insert 36, enables strength member 20 of cable 12 to be affixed within the connector and, in particular, to prevent rotational and tensile forces to be exerted upon optical fibers 18 when their termination contacts 22 are secured in place within insert recesses 28.

Securement of cable 12 to either connector 10 or 210 proceeds as follows. Cable 12, without the contacts secured to the fibers, is individually placed through uncoupled pressure sleeve nut 66, pressure sleeve 64 or 264 and strain relief body 62, in that order. The various strands of strength member 20 are then brought out and over the exterior of the strain relief body so that they extend at least backwardly beyond U-shaped annular recess 80 (see FIG. 5). An O-ring 100 is then placed over the strength member and into U-shaped annular recess 80 to secure the strength member therewithin. Any remaining filaments of the strength member which extend further backward from recess 80 into recess 82 may be cut and trimmed. Pressure sleeve 64 or 264 is then brought forward so that its circular portion 92 of its bore 90 extends over and against the O-rings in its square-shaped recess and O-ring 100 in its U-shaped recess 80 to provide respective environmental sealing and further gripping pressure through O-ring 100 against strength member 20. Pressure sleeve nut 66 is then screwed onto surface 70 to lock the pressure sleeve in position as seen in FIGS. 1 and 2.

The ends of the individual optical fibers are then cut to length and suitably prepared for coupling to the contacts, and the two are then secured together. Strain relief body 62 and insert 26 are then mated so that their respective coupling flanges 86 and 32 are interengaged and end 60b of pin 60 is seated within groove 88.

The assembly of strain relief body 62 and insert 26 is then placed within connector shell 34 or 234 so that end 60a of pin 60 engages coupling slots 58 or 258. This further assembly, including connector shell 34 or 234, is then secured together by a two part strain relief retaining mechanism.

The two part strain relief mechanism of the FIG. 1 embodiment comprises an uncoupling protection sleeve 102 having a forward end 104 and a back end 106 terminating in a collar 107. Forward end 104 slips over pressure sleeve 64 and its nut 66 and into abutment against collar 78 of strain relief body 62. Sleeve 102 also fits within rear end 108 of connector shell 34 so that substantially only collar 107 of back end 106 extends beyond the connector shell. A compression nut 109 has a back end 111 and a forward portion 112. The forward portion is split at 113, and has threads 114 therein for engagement with external threads 116 on rear end 108 of connector shell 34. A land 118 adjacent threads 114 of compression nut 109 abuts against collar 107 of sleeve 102 to trap the sleeve in its position. Split 113 of forward portion 112 is pressed together by a bolt 120 or the like to clamp compression nut 109 to connector shell 34.

The two part strain relief mechanism of the FIG. 2 embodiment comprises a nut 309 having a forward end 312 and a back end 311. Forward end 312 slips over collar 78 of strain relief body 62 and flanges 32 of insert 26 so that back end 311, which has a smaller diameter than forward end 312, will abut against collar 78. Internal threads 314 on forward end 312 are adapted to engage external threads 316 on rear end 256 of connector shell 234 to affix nut 309 to shell 234. An uncoupling protection sleeve 302 includes a forward end 304 and a back end 306. Forward end 304 is disposed to slip over nut 309 and thereby to protect the nut in the same manner as nut 109 and rear end 108 of the FIG. 1 embodiment protectively slips over its sleeve 102. Sleeve 302 of FIG. 2 is coupled to pressure sleeve 264 by a set screw 320 in back end 306 extending therefrom into an annular recess 313 to maintain the positions of nut 309, pressure sleeve 264, nut 66 and sleeve 302 and to prevent their disengagement.

Environmental sealing is provided by O-rings and between relative parts in the FIGS. 1 and 2 embodiments.

Coupling between connectors 10 and 210 and their respective mating connectors is effected by nuts 124 and 324 (FIGS. 1 and 2, respectively) having internal threads 126 and 326 which are adapted to engage threaded surfaces 128 and 328 of connector shells 34 and 234. The relationship of the parts is such that nuts 124 and 324 may be threaded over surfaces 128 and 328 of their connector shells for engagement with similar threads 128 and 328 on the connector shell of mating connectors or, alternatively, nuts 124 and 324 may be drawn backward to permit the nuts of the mating connectors to engage threaded surfaces 128 and 328 of connector shells 34 and 234. Wiper seals 130 and 330 are respectively provided between nuts 124 and 324 and connector shell 34 (FIG. 1) and sleeve 302 (FIG. 2), and one of O-rings 132 and 332 is placed within the front faces of each nut 124 and 324 for additional environmental sealing.

Dowel pins 134 and 334 extend outwardly from holes in the surfaces of connector shells 34 and 234 and are disposed to reside within slots 136 and 336 of nut 124 and 334 to prevent rotation of the nuts with respect to the remainder of connector 10 and 210 when the nuts are moved fully back. Thus, it is possible to hold one connector from rotation when a nut of a mating connector is engaged with threaded surface 128 or 328. An O-ring 138 (FIG. 1) is positioned between seal 130 on nut 124 and front end 140 of nut 109, and is compressed therebetween on one connector when nut 124 is backed against nut 109. A washer 338 on shell 234 in FIG. 2 is abuttable by an internal wall 340 of nut 324 to provide a function similar to that of O-ring 138.

Corresponding nuts 124 and 324 have internal walls 142 and 342 which are disposed to bear against walls 144 and 344 behind threaded surfaces 128 and 328 when those nuts 124 and 324 are used to mate with threads 128 and 328 of their mating connectors. O-ring 138 and washer 338 on the mating connectors can be compressed or flexed to compensate for any slack between the mating connectors after they are coupled.

One important aspect of the above-described construction is that, when mating connectors are coupled by turning nuts 124 and 324 with respect to the remainder of their connectors, the turning moments are not transmitted to the interengagements either among strain relief body 62, pressure sleeve 64 or 264 and pressure sleeve nut 66 or between strain relief body 62 and insert 26. Thus, the integrity of the interengagements are maintained and protected from uncoupling.

Although the invention has been described with reference to particular embodiments thereof, it should be realized that various changes and modifications may be made therein without departing from the spirit and scope of the invention.

What is claimed is:

1. An interchangeable multi-channel connector for cables having strength member filaments, different numbers of electromagnetic energy signal-carrying means, and terminations therefor, comprising:
   an enclosing structure having a specifically configured interior surface;
   a plurality of inserts respectively having a coupling end and having numbers of cavities which are different thereamongst for receipt of a similar number of terminations, each of said inserts having an exterior surface which is configured substantially as said interior surface for interchangeable insertion of said inserts within said enclosing structure;
   a strain relief having a body, first means securing said strength member filaments of said cables to said body second means engageable with said respective insert coupling ends to provide an intercoupled unitary structure of one of said inserts, said strain relief and said cable and third means for maintaining the securing of said filaments to said body;
   means coupled to said enclosing structure for securing said connector to a mating connector; and
   uncoupling prevention means positioned between said connector securing means and said first and third means sufficient to protect the maintaining of said third means when said connector securing means is used to secure together, or to disengage, said mating connectors.

2. A connector according to claim 1 in which said third means includes means for clamping said first means and said filaments to said strain relief, and said uncoupling prevention means comprises a sleeve placed about said first and third means and coupled to said strain relief.

3. A connector according to claim 2 in which said sleeve is further coupled to said enclosing structure.

4. An interchangeable multi-channel connector for cables having strength member filaments, different numbers of electromagnetic energy signal-carrying means, and terminations therefor, comprising:
   an enclosing structure having a specifically configured interior surface;
   means coupled to said enclosing structure for securing said connector to a mating connector;
   a plurality of inserts respectively having a coupling end and having numbers of cavities which are different thereamongst for receipt of a similar number of terminations, each of said inserts having an exterior surface which is configured substantially as said interior surface for interchangeable insertion of said inserts within said enclosing structure;
   a strain relief having first means clamping said strength member filaments of said cables thereto and including, with said connector securing means, respective separate threaded engagements with their respective threaded counterparts upon respective rotation of said first means and said connector securing means and second means engageable with said respective insert coupling ends to provide an intercoupled unitary structure of one of said inserts, said strain relief and said cable;
   uncoupling prevention means comprising a sleeve placed about said intercoupled unitary structure and coupled to said strain relief and positioned between said connector securing means and said intercoupled unitary structure sufficient to protect uncoupling thereof when said connector securing means is used to secure together, or to disengage, said mating connectors, said sleeve acting to isolate the rotation of said connector securing means from being imparted to said first means.

5. A connector according to claim 1 in which said electromagnetic energy signal-carrying means comprise optical fibers.

6. A connector according to claim 1 wherein said enclosing structure includes a connector shell having said interior surface and a coupling member, means coupling said coupling member with individual ones of said inserts for providing a non-rotatable interengagement between said connector shell and each said individual insert.

7. An interchangeable multi-channel connector for cables having strength member filaments, different numbers of electromagnetic energy signal-carrying means, and terminations therefor, comprising:
   a plurality of inserts respectively having a coupling end and having numbers of cavities which are different thereamongst for receipt of a similar number of terminations, each of said inserts having an exterior surface;
   a strain relief having first means securing said strength member filaments of said cables thereto and second means engageable with said respective insert coupling ends to provide an intercoupled unitary structure of one of said inserts, said strain relief and said cable;
   an enclosing structure having a specifically configured interior surface which is configured substantially as said exterior surface for interchangeable insertion of said inserts within said enclosing structure and including a connector shell having said interior surface and a coupling member, means coupling said coupling member with individual ones of said inserts for providing a non-rotatable interengagement between said connector shell and each said individual insert, said nonrotatable interengagement means includes a further engagement with said strain relief coupling for providing a non-rotatable interengagement among said enclosing structure, each of said respective inserts, and said strain relief means coupled to said enclosing structure for securing said connector to a mating connector; and
   uncoupling prevention means positioned between said connector securing means and said intercoupled unitary structure sufficient to protect uncoupling thereof when said connector securing means is used to secure together, or to disengage, said mating connectors.

8. A connector according to claim 7 wherein said non-rotatable interengagement means comprises said coupling member of said enclosing structure, coupling members respectively on each of said inserts and on said strain relief, and means interconnecting all of said coupling members.

9. A connector according to claim 8 wherein said coupling members are aligned and said interconnecting means comprises a pin secured to one of said coupling members and extending into recesses in said others of said coupling members.

10. A connector according to claim 6 wherein said connector shell further includes a front end having a configuration which is keyable with a connector shell of a mating like connector and wherein said non-rotatable interengagement means is positioned to provide a preselected orientation between said cavities of each said individual insert and said connector shell for ensuring proper coupling between said terminations and similar terminations in said mating connector.

11. A connector according to claim 10 wherein said front end configuration is hermaphroditically engageable with said similarly configured connector shell of said mating connector.

12. A connector for cables having strength member filaments and electromagnetic energy signal-carrying means, and termination means therefor, comprising:

an enclosing structure having means for receipt of said termination means;

a strain relief having a body, first means securing said strength member filaments of said cables to said body and second means for maintaining the securing of said filaments to said body;

means coupled to said enclosing structure for securing said connector to a mating connector; and uncoupling prevention means positioned between said connector securing means and said first and second means to prevent uncoupling thereof when said connector securing means is used to secure together, or to disengage, said mating connectors.

* * * * *